United States Patent Office 2,924,078
Patented Feb. 9, 1960

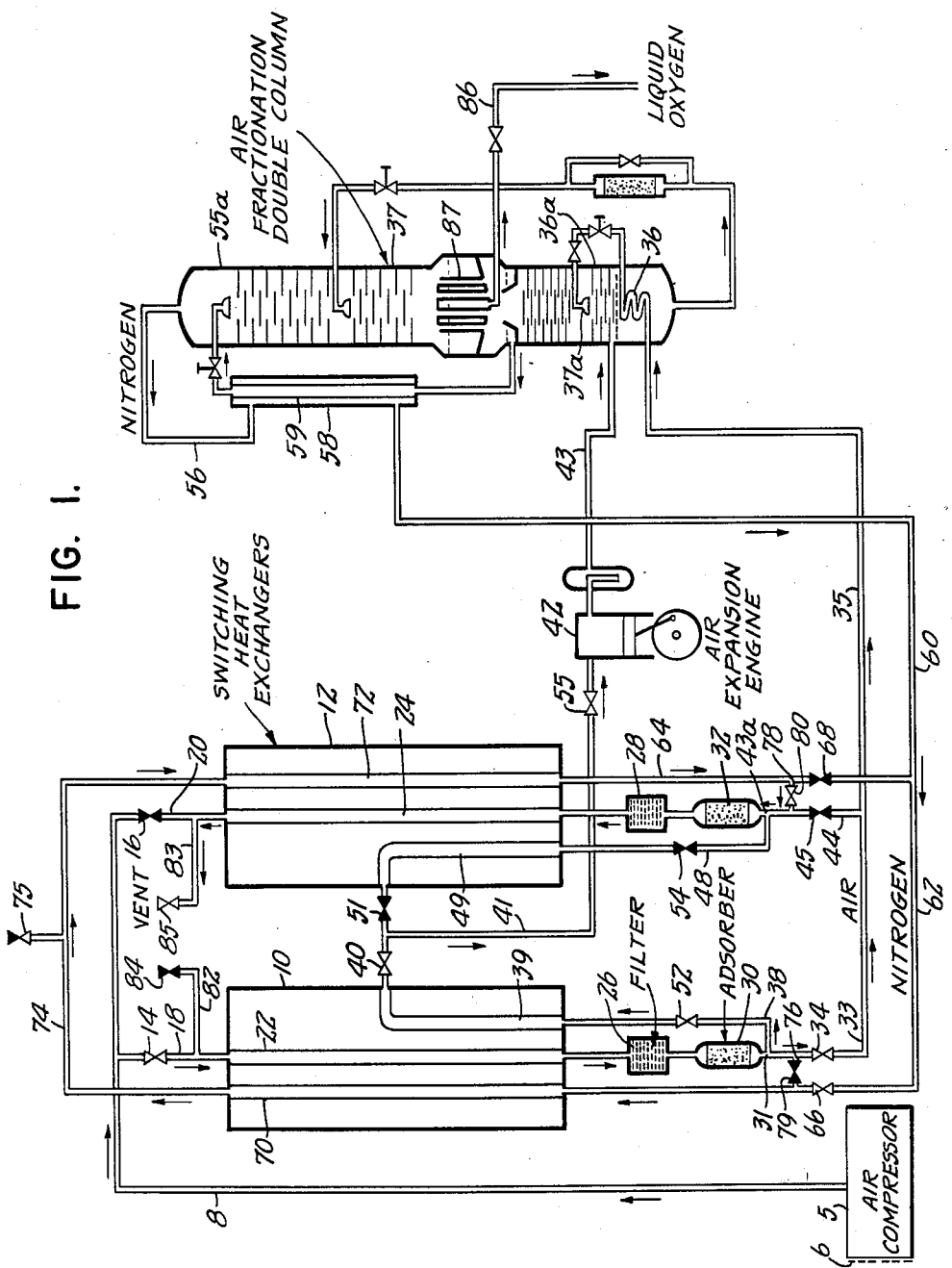

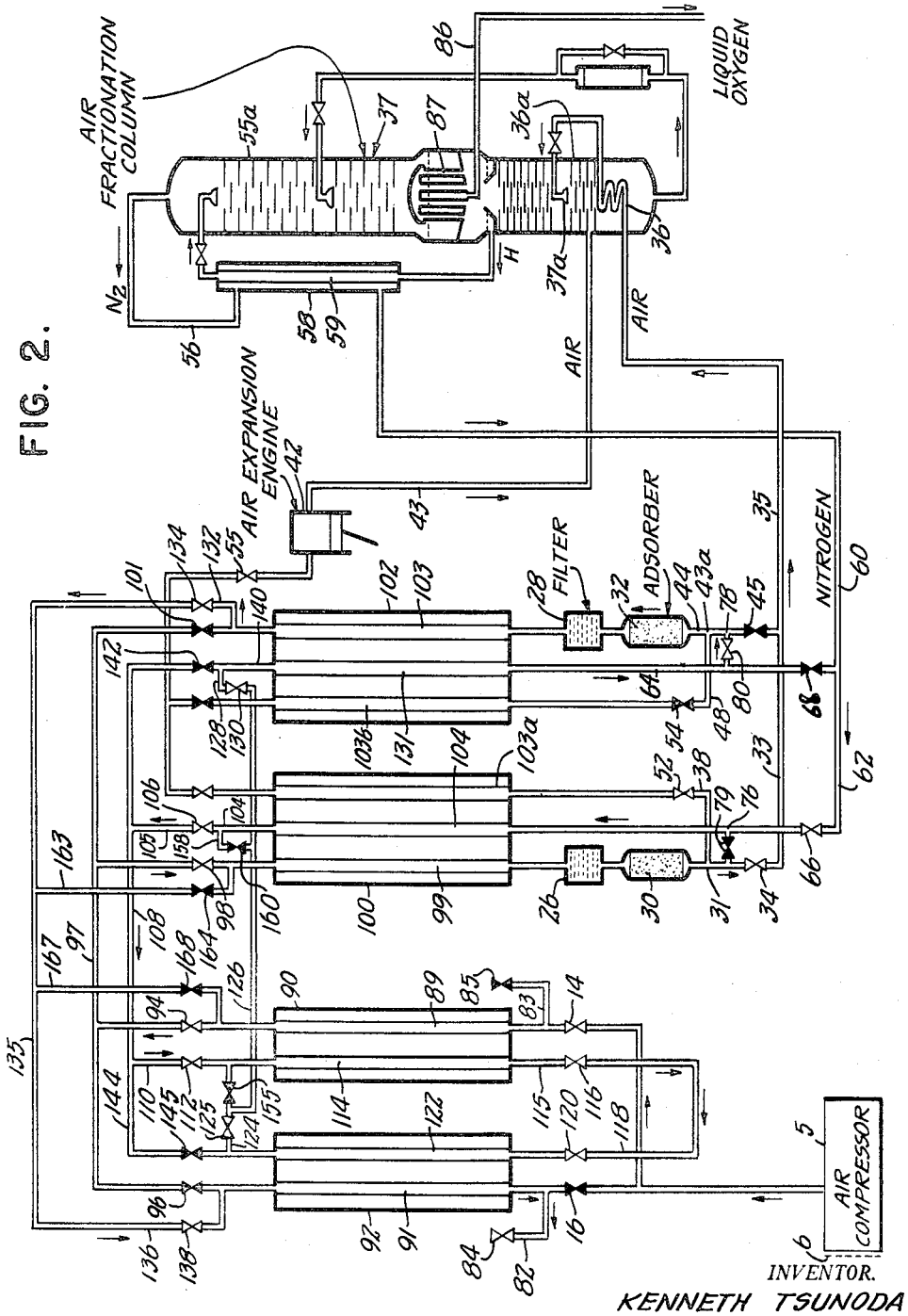

2,924,078
PROCESS AND APPARATUS FOR PRODUCING LIQUID OXYGEN

Kenneth Tsunoda, New York, N.Y., assignor to American Messer Corporation, New York, N.Y., a corporation of New York Original application June 8, 1954, Serial No. 435,201. Divided and this application June 7, 1956, Serial No. 589,932

8 Claims. (Cl. 62—38)

This invention relates to processes and apparatus for producing liquid oxygen and the like, and, in certain of its more specific aspects, to methods and means for assuring an especially effective cleaning of heat-exchangers and adsorbers.

This application is a continuation of my copending application Serial No. 435,201, filed June 8, 1954, and now abandoned.

Pursuant to the invention, highly compressed air is passed thru one of a pair of heat-exchanging means each having adsorber means associated therewith, the air being cooled to a temperature below minus 200° F. and converted to essentially liquid form in the heat-exchanging means. Part of the air is conducted directly to a liquid-oxygen fractionating tower and another part is passed thru at least the cold portion of said heat-exchanging means, and thence thru an expansion engine and to the fractionating tower. A dry gas—for example, a disposable product of the fractionating tower such as nitrogen—is at the same time passed thru said one of said heat-exchanging means and thence, preferably in the order stated, thru the adsorber means to the other heat-exchanging means and that conduit thereof thru which the highly-compressed air previously passed—being preferably also passed thru said other of said heat-exchanging means before being passed thru the adsorber means associated therewith. At periodic intervals, the operations thru the heat-exchanging means are reversed.

The invention accordingly comprises the several steps and the relation and order of one or more of such steps with respect to each of the others, and the apparatus embodying features of construction, combinations of elements and arrangements of parts which are adapted to effect such steps, all as exemplified in the following detailed disclosure, and the scope of the application of which will be indicated in the claims.

For a fuller understanding of the nature and objects of the invention, reference should be had to the following detailed description taken in connection with the accompanying drawings, in which:

Figure 1 is a diagrammatic showing of one form of the invention; and

Fig. 2 is a similar showing of a modified form.

In the exemplification of Fig. 1, there is provided an air compressor 5 which has an inlet 6 and wherein air is compressed to over 1000 pounds per square inch gage and preferably to between about 2000 and about 3000 pounds per square inch, for example 2840 pounds per square inch gage (200 atmospheres). The highly-compressed air to be cooled is conducted thru a conduit 8 toward the warm end of one or the other of heat-exchangers 10 and 12, the flow thereof being controlled by valves 14 and 16, respectively, in conduits 18 and 20, respectively. From the conduit 18 the highly-compressed air enters a conduit 22 in heat-exchanger 10 or the conduit 24 in the heat-exchanger 12, where it is cooled to a temperature of about minus 250° F., at which temperature and at the above pressure the air is essentially liquid, and thence to a filter 26 or a filter 28, respectively, and thence to an adsorber 30 or an adsorber 32, respectively. Each filter will, before the liquid air enters the adsorber, separate out water and carbon dioxide which are carried along as precipitated solids, and the adsorber will adsorb traces of hydrocarbon as well as of carbon dioxide which are dissolved in the liquid air. As shown, the valve 14 is open and the valve 16 closed so that the flow will be thru the heat-exchanger 10, which then constitutes the active heat-exchange means.

The flow is divided at 31, and a portion of the liquid air from the adsorber 30 is conducted thru a conduit 33, in which there is a valve 34, and thru a conduit 35 to a coil 36 in the middle-pressure portion 36a of a liquid-oxygen fractionating tower 37 of standard design and thence to a discharge point 37a in middle-pressure portion 36a, and another portion of the liquid air is conducted thru a conduit 38 back to the heat-exchanger 10 where it runs thru a conduit 39 in the cold portion of the heat-exchanger, where it is warmed to a temperature (e.g., about minus 40° F.) which is above its liquefaction temperature at the exemplified pressure, and then runs past a valve 40 to a conduit 41 leading thru an air expansion engine 42 and thence thru a conduit 43 to the interior of the middle-pressure portion 36a of the fractionating tower 37.

The effectiveness of this arrangement is such that each heat-exchanger will operate for many hours before again needing the clean-up operation performed by the nitrogen flow.

Similarly, when the heat-exchanger 12 is the active heat-exchange means, the flow is divided at 43a and a portion of the liquid air from the adsorber 32 flows thru a conduit 44 under control of a valve 45 to the conduit 35 and thence directly to the coil 36 and discharge 37a, and another portion leads thru a conduit 48 to heat-exchanger 12 where it is conducted thru the cold portion thereof in a conduit 49 leading to a valve 50 and thence to the conduit 41. Valves 52 and 54 are provided in the conduits 38 and 48, respectively, and a valve 55 is provided in the conduit 41.

Nitrogen from the low-pressure portion 55a of the fractionating tower 37 is conducted thru conduit 56 leading from the top of the fractionating tower to a heat-transfer member 58, wherein reflux nitrogen in conduit 59 is cooled and the nitrogen from conduit 56 slightly warmed to about minus 280° F., at which temperature it enters the cold end of whichever heat-exchanger is active, being led thence thru a conduit 60 and one or the other of conduits 62 and 64 (62 as shown) depending on the setting of valves 66 and 68, respectively. The conduits 62 and 64 lead, respectively, to conduits 70 and 72 in the heat-exchangers 10 and 12 and thence to an inverted U-shaped conduit 74 connecting the conduits 70 and 72. The conduits 62 and 64, respectively, are interconnected with the conduits 33 and 44 by conduits 76 and 78 carrying valves 79 and 80, the valve 79 being shown closed and the valve 80 being shown open. The nitrogen will thus flow, when the heat-exchanger 10 is active, upwardly thru conduit 62 and thru conduit 70 in heat-exchanger 10, thru conduit 74 equipped with blow-off valve 75, and from conduit 74 downwardly thru conduit 72 in heat-exchanger 12 to conduit 64 and thru conduit 78, adsorber 32, and filter 28, whence it will flow upwardly thru the conduit 24 in heat-exchanger 12. Conduits 22 and 24 are provided, respectively, with outlets 82 and 83 under control of valves 84 and 85 the latter being open as shown. The nitrogen which has been warmed in the active heat-exchanger will thus vaporize the particles of carbon dioxide and water which have adhered to the adsorber, filter, and the walls of conduit 24 of the inactive heat-exchanger when it was last active, and will carry these materials off with it, and will also, in its flow thru conduit 72, in the present instance, warm the heat-exchanger 12.

Similarly, when the operations are reversed and the various valves opened and closed as required, the nitrogen will flow thru the conduits 64, 72, 74, 70, and 62 and thru the conduit 76, the adsorber 30, the filter 26, and the conduit 22 in heat-exchanger 10, and out thru the vent 84.

Liquid oxygen is drawn off thru conduit 86 from the bottom of condenser 87 of the fractionating tower.

In the form of construction shown in Fig. 2, each of the pair of heat-exchanging means is composed of two heat exchangers which together function in the same manner as does each single heat-exchanger of Fig. 1. The highly-compressed air from the air compressor 5 is permitted to flow in the direction of the arrows thru valve 14 to a conduit 89 in a heat-exchanger 90 which is similar to the upper portion of the heat-exchanger 10; or thru valve 16, when open, thru a conduit 91 in a heat-exchanger 92 which is similar to the upper portion of the heat-exchanger 12. From the conduit 89 the air flows past a valve 94, and from the conduit 91 it flows past a valve 96, when open, and thence thru a conduit 97, and thence in the direction of the arrow past a valve 98 to a conduit 99 in a heat-exchanger 100 which is similar to the lower portion of the heat-exchanger 10, or thru a valve 101, when open, to a heat-exchanger 102 which is similar to the lower portion of the heat-exchanger 12 and wherein it flows thru a conduit 103. The liquefied compressed air then flows from conduits 99 and 103, respectively, thru filters 26 and 28 and adsorbers 30 and 32 and is then divided and one part conducted past valve 52 or 54 and thru conduit 103a or 103b in the heat-exchanger 100 or 102, respectively, where the gas is warmed to a temperature (e.g., about minus 40° F.) which is above its liquefaction temperature at the exemplified pressure of 2840 pounds per square inch gage and thru the expansion engine 42. The other part is conducted directly to the middle-pressure portion 36a of the fractionator 37 from the condenser 87 of which liquid oxygen is withdrawn, the means employed being similar to those of Fig. 1 and bearing similar reference numbers.

Nitrogen flow thru the heat-exchange means 90—100 and the heat-exchange means 92—102 is similarly provided. Nitrogen flows from conduit 62 thru a conduit 104 in heat-exchanger 100 to a conduit 105 containing valve 106 thru a conduit 108 to a conduit 110 containing valve 112, and thru a conduit 114 in heat-exchanger 90 to a conduit 115 containing valve 116 and a conduit 118 containing valve 120 to a conduit 122 in heat-exchanger 92 whence it flows to a conduit 124 containing valve 125 and thru a conduit 126 to a conduit 128 containing valve 130 and thru a conduit 131 in heat-exchanger 102 and thence back thru conduit 78 and the adsorber 32 and the filter 28 and thru conduit 103 in the heat-exchanger 102. Thence it flows thru a conduit 132 containing valve 134, a conduit 135, and a conduit 136 containing valve 138 to conduit 91 in heat-exchanger 92 and thence thru outlet conduit 82 and outlet valve 84. Similarly, when the operation is reversed, nitrogen flows from conduit 60 thru conduits 64, 131, 140, 108, 144, 122, 118, 115, and 114, past valve 155, thru conduit 126 to conduit 158 containing valve 160, thru conduit 104 past valve 79, thru adsorber 30, filter 26, conduit 99, conduit 163 containing valve 164, thru a portion of conduit 135 to conduit 167 containing valve 168, and thence to conduit 89, outlet conduit 83, and outlet valve 85.

Since certain changes in carrying out the above process and in the constructions set forth, which embody the invention, may be made without departing from its scope, it is intended that all matter contained in the above description or shown in the accompanying drawings shall be interpreted as illustrative and not in a limiting sense.

I claim:
1. A process of separating in essentially liquid form a component of a gaseous mixture, which comprises highly compressing a gaseous mixture to an extent such that it will be converted into essentially liquid form in a heat-exchange means thru which a component of the mixture is counterflowed from a fractionating means, flowing the compressed gaseous mixture thru reversible heat-exchange means in one direction and converting it into essentially liquid form during its flow therethru, flowing it while in essentially liquid form thru adsorber means, dividing the flow and conducting one part thereof directly to the middle pressure portion of a fractionating means while in essentially liquid form, and conducting another part thereof thru at least a portion of the heat-exchange means in the opposite direction, expanding said other part and introducing it into the middle-pressure portion of the fractionating means; withdrawing from the fractionating means a desired component in essentially liquid form without passing it thru said heat-exchange means; drawing another component in gaseous form from the fractionating means and passing it thru the heat-exchange means in said opposite direction, and then flowing it so as to vaporize solidified gases in an inactive heat-exchange means and associated adsorber means; and periodically reversing the operation so that at certain times the flow thru the first-mentioned heat-exchange means and adsorber means is as defined in connection with said inactive means and the flow thru said inactive means is as defined in connection with said first-mentioned means; said other component being conducted from the first-mentioned heat-exchange means and thence, to vaporize solidified gases, thru the adsorber means associated with said inactive heat-exchange means and back thru said inactive heat-exchange means.

2. Apparatus for separating in liquid form a component of a gaseous mixture, comprising a fractionator, means for conducting said component therefrom in liquid form, means for conducting therefrom another component in gaseous form, means for highly compressing a gaseous mixture, a pair of heat-exchange systems each having means for conducting in heat-exchange relationship a stream of said highly-compressed mixture flowing in one direction and a stream of said other component flowing in the opposite direction, said compressing means being arranged to compress the gas to such extent that it will be in essentially liquid form after flowing thru said heat-exchange system in said direction, adsorber means associated with each system, means for selectively directing both said mixture and said component to one or the other of said systems, means for conducting while in essentially liquid form thru an associated adsorber means the stream of mixture which has flowed thru the heat-exchange system to which it is directed, means for dividing into two parts the stream which has flowed thru said adsorbed means, expansion means, means for reconducting one of said parts thru at least a portion of the last-mentioned system in said other direction and thence thru said expansion means to the middle pressure portion of said fractionator, means for conducting the other of said parts directly to said middle pressure portion of said fractionator, and means for conducting said other component from said last-mentioned heat-exchange system and thru the other of said heat-exchange systems and the adsorber means associated therewith to vaporize solidified gases in the last-mentioned adsorber means and heat-exchange system.

3. Apparatus as in claim 2 wherein each system is composed of a plurality of heat-exchangers.

4. Apparatus as in claim 2 wherein each system is composed of a single integral heat-exchanger.

5. Apparatus as in claim 2 wherein said reconducting means extend only part way thru the heat-exchange systems.

6. Apparatus as in claim 2 wherein means are provided in advance of the last-mentioned conducting means for conducting said other component thru said other heat-exchange system, and wherein said last-mentioned conducting means leads first thru the adsorber and then thru said other system.

7. Apparatus as in claim 2 wherein filter means are provided between each means for conducting a stream of mixture in said one direction and its associated adsorber means.

8. Apparatus for separating gases comprising a rectification column having a condenser, a low-pressure portion above said condenser; and a middle-pressure portion below said condenser; a reversible pair of heat-exchange means each having a warm end and a cold end and having adsorber means associated with the cold end thereof; means for compressing a gaseous mixture to an extent such that it will be converted into essentially liquid form in its flow from the warm end to the cold end of the heat-exchange means; expansion means; means for conducting a highly-compressed gaseous mixture from the compression means to the warm end of either one of the heat-exchange means, thru it to the cold end thereof, and while still in essentially liquid form thru said adsorption means; means for conducting part of said mixture directly thence and while it is still in said essentially liquid form to the middle-pressure portion of said column; means for conducting the remainder of said mixture to the cold end of the active heat-exchange means and at least part-way back toward the warm end thereof, thence to said expansion means, and thence to said middle-pressure portion; valve means for controlling which of said heat-exchange means will be active and which inactive; each of said heat-exchange means being formed for the flow therethru of a single additional gas; means for conducting a separation product from the low-pressure portion of said column to the cold end of whichever heat-exchange means is active and thru the same to the warm end thereof and thereafter to the adsorber means associated with the other heat-exchange means and thru the latter; and means for conducting a separation product in liquid form from said condenser.

References Cited in the file of this patent

UNITED STATES PATENTS

| | | |
|---|---|---|
| 2,496,380 | Crawford | Feb. 7, 1950 |
| 2,503,939 | De Baufre | Apr. 11, 1950 |
| 2,534,478 | Roberts | Dec. 19, 1950 |
| 2,572,933 | Houvener | Oct. 30, 1951 |
| 2,584,381 | Dodge | Feb. 5, 1952 |
| 2,617,275 | Goff | Nov. 11, 1952 |
| 2,641,450 | Garbo | June 9, 1953 |
| 2,643,525 | Cartier | June 30, 1953 |
| 2,650,481 | Cooper | Sept. 1, 1953 |
| 2,671,324 | Trumpler | Mar. 9, 1954 |

FOREIGN PATENTS

| | | |
|---|---|---|
| 633,686 | Germany | Aug. 4, 1936 |